United States Patent
Michels

(10) Patent No.: US 11,557,063 B2
(45) Date of Patent: Jan. 17, 2023

(54) METHOD FOR CALIBRATING A PHOTODETECTOR ARRAY, A CALIBRATION DEVICE, AND AN ASSOCIATED IMAGING SYSTEM

(71) Applicant: SAFRAN ELECTRONICS & DEFENSE, Paris (FR)

(72) Inventor: Yves Michels, Moissy Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/645,868

(22) Filed: Dec. 23, 2021

(65) Prior Publication Data
US 2022/0207775 A1    Jun. 30, 2022

(30) Foreign Application Priority Data

Dec. 24, 2020 (FR) ...................................... 2014126

(51) Int. Cl.
*G06T 7/80* (2017.01)
*G06T 5/50* (2006.01)
(Continued)

(52) U.S. Cl.
CPC .................. *G06T 7/80* (2017.01); *G06T 5/20* (2013.01); *G06T 5/50* (2013.01); *G06T 7/20* (2013.01); *H04N 5/3651* (2013.01); *H04N 5/3675* (2013.01); *H04N 17/002* (2013.01); *G06T 2207/10016* (2013.01); *G06T 2207/10048* (2013.01); *G06T 2207/30168* (2013.01)

(58) Field of Classification Search
CPC .... G06T 7/80; G06T 7/20; G06T 5/20; G06T 5/50; G06T 2207/10016; G06T 2207/10048; G06T 2207/30168; H04N 5/3651; H04N 5/3675; H04N 17/002
See application file for complete search history.

(56) References Cited

U.S. PATENT DOCUMENTS 9,756,264 B2 *    9/2017   Hoelter ................ H04N 5/3675
10,609,281 B2 *   3/2020   Smith .................. H04N 5/23232
(Continued)

OTHER PUBLICATIONS

French Preliminary Search Report dated Sep. 6, 2021 in French Application 2014126 filed on Dec. 24, 2020 (with English Translation of Categories of Cited Documents), citing documents AA-AB therein, 2 pages.

*Primary Examiner* — Brian P Yenke
(74) *Attorney, Agent, or Firm* — Oblon, McClelland, Maier & Neustadt, L.L.P.

(57) ABSTRACT

A method for calibrating a photodetector array supplying a video stream includes: a determination step, wherein an offset table is determined for each current image of the video stream based on at least two corrections from among the following: a first correction from a comparison of the current image to a corresponding predetermined reference table; a second correction from a calculation of a column error of the current image; and a third correction from a high-pass temporal filtering of the video stream; and a calculation step, wherein a current value of an offset table, equal to a sum between a previous value of the offset table and a weighted sum of at least two corrections, is calculated, with each coefficient of the offset table being associated with a respective photodetector of the array.

20 Claims, 1 Drawing Sheet

Legend
2: Calibration device
4: Imaging device
5: Imaging device
6: Photodetector array
8: Offset calculation stage
10: Processing system
12: Correction member based on reference tables
14: Correction member based on the image morphology
16: Correction member based on the motion of the scene
18: Motion estimation member

(51) Int. Cl.
*H04N 5/365* (2011.01)
*H04N 5/367* (2011.01)
*G06T 5/20* (2006.01)
*G06T 7/20* (2017.01)
*H04N 17/00* (2006.01)

(56) References Cited

U.S. PATENT DOCUMENTS

| | | | |
|---|---|---|---|
| 10,757,394 B1* | 8/2020 | Wang | H04N 5/232 |
| 2002/0159101 A1* | 10/2002 | Alderson | H04N 5/33 |
| | | | 348/E5.081 |
| 2007/0019085 A1* | 1/2007 | Suzuki | H04N 5/374 |
| | | | 348/241 |
| 2010/0329583 A1* | 12/2010 | Whiteside | G06T 5/002 |
| | | | 382/260 |
| 2015/0103200 A1* | 4/2015 | Vondran, Jr. | H04N 9/09 |
| | | | 348/222.1 |
| 2015/0319387 A1 | 11/2015 | Saragaglia et al. | |
| 2017/0180722 A1* | 6/2017 | Manbeck | H04N 5/145 |
| 2017/0374305 A1* | 12/2017 | Kostrzewa | G06T 5/005 |
| 2018/0352174 A1 | 12/2018 | Kuybeda et al. | |
| 2019/0130535 A1* | 5/2019 | Williams | G06T 5/20 |
| 2022/0256076 A1* | 8/2022 | Douady | H04N 5/2258 |

* cited by examiner

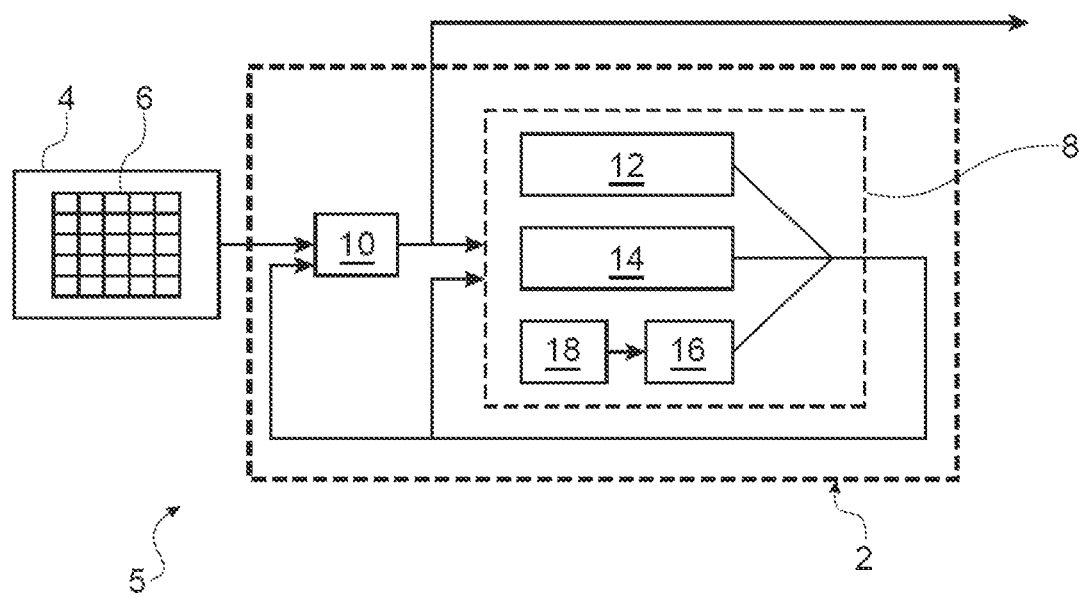
Legend
2: Calibration device
4: Imaging device
5: Imaging device
6: Photodetector array
8: Offset calculation stage
10: Processing system
12: Correction member based on reference tables
14: Correction member based on the image morphology
16: Correction member based on the motion of the scene
18: Motion estimation member

METHOD FOR CALIBRATING A PHOTODETECTOR ARRAY, A CALIBRATION DEVICE, AND AN ASSOCIATED IMAGING SYSTEM

TECHNICAL FIELD

The invention relates to a method for calibrating a photodetector array providing a set of response signals constituting a video stream comprising a series of images. The invention also relates to a calibration device and an imaging system comprising such a calibration device.

The invention is especially applicable to the field of imaging devices, particularly automatic calibration of non-uniformities of the photodetectors in the same sensor.

PRIOR ART

There are known imaging devices, such as cameras, incorporating at least one photodetector array, also referred to as sensors in the remainder of this document.

In such a photodetector array, particularly when it is intended for imaging in the far infrared spectral range, a response signal from each photodetector, also called a pixel, is not uniform at the same input optical intensity. For example, this is the case in a photodetector array for an uncooled infrared camera, also referred to by the acronym LWIR, which stands for "LongWave infrared."

In order to obtain a usable image from the response signal issued by such a photodetector array, a correction of the pixel non-uniformities is required. In particular, this is done by independently applying an offset correction and/or gain correction to each pixel.

The gain correction is typically done by means of a gain table in which each pixel is associated with a corresponding gain. Such a gain table essentially depends on the input optics of the imaging device and remains substantially constant throughout the life of the imaging device.

Consequently, it is suitable to estimate the gain table only once, namely at the end of the assembly of the imaging device, such as at the factory.

However, the offset specific to each pixel depends on numerous factors that evolve over time, including the ambient temperature and sensor ageing. Consequently, using an offset table that does not change over time is not appropriate.

Various correction methods have been conceived to overcome this problem.

For example, performing a so-called "one-point calibration" at regular time intervals has been proposed. Such a one-point calibration consists in mechanically generating, particularly by means of a cover or defocusing of the input optics of the imaging device, a homogeneous scene in order to estimate the offset error of each pixel. A new offset table resulting in a corrected image that is also homogeneous, is then deduced. In such a case, the resulting offset table is used without modification until the next calibration.

In addition, when the imaging device or its usage protocol does not allow for the creation of a homogeneous scene, a real-time calibration is known to be done using information relating to a temperature of the sensor. Such a real-time calibration, also referred to as a photometric non-uniformity correction, consists in modelling the offset error by a polynomial of the sensor temperature, for example a $3^{rd}$ degree polynomial, with the temperature being measured by a temperature sensor placed in the vicinity of the sensor.

However, such calibration methods are not entirely satisfactory. Indeed, one-point calibration causes a break in the video stream delivered by the imaging device each time it is implemented. In addition, under certain usage conditions, such a calibration keeps a residual error. In addition, the photometric non-uniformity correction only corrects the contribution of temperature to the offset error.

A purpose of the invention is therefore to propose a calibration method that can be used in real time, that requires little in the way of computational resources, and that can be implemented with any type of scene, whether still or involving motion.

DISCLOSURE OF THE INVENTION

To that end, the subject-matter of the invention is a calibration method of the aforementioned type, comprising:
  a determination step, wherein an offset table is determined for each current image of the video stream based on at least two corrections from among the following:
    a first correction based on a comparison of the current image to a corresponding reference table from among at least one predetermined reference offset table associated with the photodetector array;
    a second correction based on a calculation of a column error of the current image; and
    a third correction based on temporal filtering of the high spatial frequencies of the current image of the video stream;
  a calculation step, wherein a current value of an offset table, equal to a sum between a previous value of the offset table and a weighted sum of the at least two corrections, is calculated, with each coefficient of the offset table being associated with a respective photodetector of the photodetector array.

Indeed, in such a method the calculation of the first correction based on a reference table avoids resorting to an optimization of a weighted sum of a plurality of reference tables, which requires inversion of a correlation matrix, an operation with a high degree of algorithmic complexity.

In addition, the second correction is limited to a column error, that is, an error in a single dimension of the current image. Consequently, determination of the second correction does away with resorting to a conventionally used temporal median, which allows for correction of a single current image.

Using a temporal filtering of the high spatial frequencies of the current image makes it possible to eliminate the residual high-frequency two-dimensional errors that would not have been eliminated by the first and/or second correction, thus avoiding an inlay of the edges of the objects in the scene.

Lastly, the first, second, and third corrections relate to complementary errors in the video stream in such a way that said corrections do not interfere with each other.

According to other advantageous aspects of the invention, the calibration method includes one or more of the following features, taken individually or in all the technically possible combinations:
  the first correction, at any given calculation instant associated with the current image of the video stream, is determined according to the law:

$$\delta_{CBM}(k) = \alpha_k{}^* T_{R,k}$$

where $\delta_{CBM}(k)$ is the current value of the first correction at the calculation instant k;

$T_{R,k}$ is the reference offset table implemented at calculation instant k; and $\alpha_k$ is a first weighting factor, between 0 and 1, at calculation instant k;

the first weighting factor is determined according to the law:

$$\alpha_k = \frac{\langle F_1(T_{R,k}) | F_1(I_{k-1}) \rangle}{\langle F_1(T_{R,k}) | F_1(T_{R,k}) \rangle}$$

where $\langle | \rangle$ is the canonical scalar product;

$F_1$ is a first predetermined high-pass filter; and $I_{k-1}$ is an image prior to the current image;

the second correction, at any given calculation instant associated with the current image of the video stream, is determined from a calculation of a column error of the current image, so that:
  at least one intermediate image is generated; and
  the average, over the columns, of the gradients of the lines of the intermediate image is calculated;

the second correction is equal to a spatial integral of an average, over the columns of a current image of the video stream, of the gradients of the lines;

the average is a robust average obtained from gradient values falling within a predetermined confidence interval;

the third correction, at any given calculation instant from the current image of the video stream, is determined according to the law:

$$\delta_{WHF}(k) = \gamma^* F_{sat}(F_{threshold}(F_2(I_k)))$$

where $\delta_{WHF}(k)$ is the value of the third correction associated with instant k;

$\gamma$ is a third predetermined weighting factor;

$F_{sat}$ is a predetermined saturation function;

$F_{threshold}$ is a predetermined thresholding function; and $F_2$ is a second predetermined high-pass spatial filter;

the second high-pass spatial filter comprises a line filter configured to act on the lines of the current image and a column filter configured to act on the columns of the current image, and the method comprises implementation of the line filter and/or the column filter as a function of a result of an estimation of a motion in the video stream;

the video stream is obtained by applying a one-point calibration and/or a photometric non-uniformity correction to the response signals;

calculation of the third correction is preceded by the application of a defective pixel correction to the video stream;

the method further comprises implementation of the current value of the offset table to correct the video stream in order to deliver a corrected video stream.

In addition, the subject-matter of the invention is a photodetector array calibration device providing a set of response signals forming a video stream comprising a series of images, the calibration device including an offset calculation stage comprising at least two of the following:
  a correction member based on reference tables;
  a correction member based on the image morphology; and
  a correction member based on the motion of the scene, in order to process the video stream.

According to other advantageous aspects of the invention, the calibration device includes one or more of the following features, taken individually or in all the technically possible combinations:
  the correction member based on reference tables is capable of determining for each current image of the video stream a first correction based on a comparison of the current image to a corresponding reference table from among at least one predetermined reference offset table associated with the photodetector array;
  the first correction, at any given calculation instant associated with the current image of the video stream, is determined according to the law:

$$\delta_{CBM}(k) = \alpha_k^* T_{R,k}$$

where $\delta_{CBM}(k)$ is the current value of the first correction at the calculation instant k;

$T_{R,k}$ is the reference offset table implemented at calculation instant k; and $\alpha_k$ is a first weighting factor, between 0 and 1, at calculation instant k;

the first weighting factor is determined according to the law:

$$\alpha_k = \frac{\langle F_1(T_{R,k}) | F_1(I_{k-1}) \rangle}{\langle F_1(T_{R,k}) | F_1(T_{R,k}) \rangle}$$

where $\langle | \rangle$ is the canonical scalar product;

$F_1$ is a first predetermined high-pass filter; and $I_{k-1}$ is an image prior to the current image;

the correction member based on the image morphology is capable of determining, for each current image of a video stream, a second correction from a calculation of a column error of the current image;

the correction member based on the image morphology is configured so that, for each current image associated with any given calculation instant:
  at least one intermediate image is generated; and
  the average, over the columns, of the gradients of the lines of the intermediate image is calculated;

the correction member based on the motion of the scene is capable of determining, for each current image of a video stream, a third correction from a temporal filtering of the high spatial frequencies of the current image of the video stream;

the third correction, at any given calculation instant from the current image of the video stream, is determined according to the law:

$$\delta_{WHF}(k) = \gamma^* F_{sat}(F_{threshold}(F_2(I_k)))$$

where $\delta_{WHF}(k)$ is the value of the third correction associated with instant k;

$\gamma$ is a third predetermined weighting factor;

$F_{sat}$ is a predetermined saturation function;

$F_{threshold}$ is a predetermined thresholding function; and $F_2$ is a second predetermined high-pass spatial filter;

the second high-pass spatial filter comprises a line filter configured to act on the lines of the current image, and a column filter configured to act on the columns of the current image;

the calibration device comprises a processing system configured to receive an offset table calculated by the offset calculation stage in order to process and/or correct the video stream;

the calibration device comprises a motion estimation member configured to compare a spatial gradient and a temporal gradient of the images and to output information relating to a direction of motion in the current image.

The subject-matter of the invention is also an imaging system comprising an imaging device and a calibration device as defined above.

According to other advantageous aspects of the invention, the imaging system includes one or more of the following features, taken individually or in all the technically possible combinations:

the calibration device is connected to the output of the imaging device;

the imaging device comprises a photodetector array configured to deliver response signals from the photodetector array to the calibration device.

BRIEF DESCRIPTION OF THE DRAWINGS

The invention will be better understood and other features and advantages will become apparent from the following description comprising embodiments given as examples in reference to the appended FIGURE, presented as non-limiting examples which may serve to complete the understanding of the invention and the description of its implementation and, if applicable, contribute to the definition thereof, in which:

FIG. 1 is a schematic representation of a calibration device according to the invention.

DETAILED DESCRIPTION

A calibration device 2 according to the invention is shown in FIG. 1, which is a schematic representation. The calibration device 2 is connected to an output of an imaging device 4. The calibration device 2 is capable of receiving a video stream delivered by the imaging device 4. For example, the calibration device 2 and the imaging device 4 are integrated into the same imaging system 5.

The imaging device 4 comprises at least one photodetector supplying a response signal. Advantageously, the imaging device 4 comprises a plurality of photodetectors. In such an arrangement, the photodetectors are arranged according to a photodetector array 6 of the imaging device 4.

The calibration device 2 is configured to determine an error, in particular an offset error, affecting at least one pixel in the photodetector array 6 of the imaging device 4.

The photodetectors of the array 6 provide a set of response signals. The set of response signals supplied by the photodetectors of the array 6 form the video stream delivered by the imaging device 4. By known means, such a video stream comprises a series of images over time, also referred to as a scene.

The calibration device 2 includes an offset calculation stage 8 and a processing system 10, also referred to as a processing stage 10, capable of processing the video stream.

The offset calculation stage 8 is configured to calculate an offset table associated with the array 6, in particular from the video stream. Advantageously, the offset table associated with the array 6 includes at least one coefficient. In particular, the offset table associated with the array 6 includes a plurality of coefficients. In this case, it is preferable for each coefficient of the offset table to be associated with a respective photodetector in the array 6. More specifically, the coefficient is involved in a correction of the response signal of the corresponding photodetector.

As will become clear from the following description, the offset calculation stage 8 is adapted to perform a real-time calculation. The offset calculation stage 8 also implements the previous values of the offset table at any given calculation instant k.

According to the invention, the processing system 10 is configured to receive the offset table calculated by the offset calculation stage 8 in order to process the video stream delivered by the imaging device 4.

The offset calculation stage 8 comprises at least two of the following:

a correction member based on reference tables 12;
a correction member based on the image morphology 14; and
a correction member based on the motion of the scene 16.

More particularly, the correction member based on the motion of the scene 16 is connected to an output of a motion estimation member 18. Preferably, the motion estimation member 18 is integrated into the offset calculation stage 8.

Hereinafter, the correction member based on reference tables 12 may also be called a CBM member 12, the acronym "CBM" standing for "CoBalt Multi," meaning "Linear COmBinAtion of Tables." It should be noted that the correction member based on reference tables 12 is also called an ICT member, with the acronym "ICT" standing for "Iterative Combination of Tables."

Likewise, the correction member based on the image morphology 14 may also be called, hereinafter, a W1D member 14, with the acronym "W1D" standing for "Weiss uni-Dimensional."

Lastly, the correction member based on the motion of the scene 16 may also be called, hereinafter, a WHF member 16, with the acronym "WHF" standing for "Weiss High Frequency."

According to the configuration shown, the correction member based on reference tables 12, the correction member based on the image morphology 14, and the correction member based on the motion of the scene 16 are configured to work in parallel. In particular, the correction member based on reference tables 12, the correction member based on the image morphology 14, and the correction member based on the motion of the scene 16 are each capable of calculating a corresponding correction, respectively.

In addition, the current value of the offset table delivered by the offset calculation stage 8 at any given calculation instant k is equal to the value of the offset table at the previous calculation instant k−1, to which is added a sum, preferably a weighted sum, of the corrections calculated by the correction member based on reference tables 12, the correction member based on the image morphology 14, and/or the correction member based on the motion of the scene 16, respectively, for the current calculation instant k.

As will become clear from the following, the correction member based on reference tables 12, the correction member based on the image morphology 14, and/or the correction member based on the motion of the scene 16 are configured to correct complementary errors in the video stream, so that the corrections they deliver will not interfere with each other.

The correction member based on reference tables 12, or member CBM 12, is configured to determine an offset error, particularly a primary component of the offset error. According to the invention, a primary component means a component that can initially be calculated from a calibration table. The calibration table can be established a single time, particularly at the factory, for the lifetime of the imaging device 4 and/or the imaging system 5.

More specifically, the correction member CBM 12 is configured to receive the video stream delivered by the imaging device 4 and therefore to determine a first correction $\delta_{CBM}$ from the video stream and a set of reference tables, preferably a predetermined set of reference tables.

For example, the reference tables are stored in the calibration device 2 during a previous configuration step, for example upon completion of the assembly of the imaging system 5, in particular at the factory.

The operation of the member CBM 12 is based on a comparison of the high frequencies of the video stream images to the reference tables.

More specifically, the correction member CBM 12 is configured to determine, at any given calculation instant k, the first correction $\delta_{ow}$ from an image of the video stream, also referred to as the current image $I_k$, according to the law:

$$\delta_{CBM}(k) = \alpha_k{}^* T_{R,k}$$

where $\delta_{CBM}(k)$ is the value of the first correction at the calculation instant k;

$T_{R,k}$ is the reference offset table implemented at calculation instant k; and $\alpha_k$ is a first weighting factor, between 0 and 1, at calculation instant k.

The reference offset table $T_{R,k}$ is then injected into the function CBM 12. In the case of a set of N reference tables indexed by an integer P, the reference table of index P will be injected at the instant k, where P=mod(k, N), that is, k modulo N.

The first weighting factor $\alpha_k$ is calculated from the prior image $I_{k-1}$ to the current image $I_k$ according to the law:

$$\alpha_k = \frac{\langle F_1(T_{R,k}) | F_1(I_{k-1}) \rangle}{\langle F_1(T_{R,k}) | F_1(T_{R,k}) \rangle}$$

where <l> is the canonical scalar product;

$F_1$ is a first predetermined high-pass filter; and $I_{k-1}$ is the image prior to the current image $I_k$.

For the reference table $T_{R,k}$ implemented at the calculation instant k, the first weighting factor $\alpha_k$ is preferably calculated at the preceding instant k−1, particularly for material reasons of video stream management.

Such features of the member CBM 12 are particularly advantageous. Indeed, the determination of the first correction $\delta_{CBM}$ implements a simple canonical scalar product, which is an operation requiring little in terms of computational resources.

Conversely, a calculation aimed at optimizing a weighted sum of a plurality of reference tables in order to obtain an offset table from a single current image $I_k$, would require an inversion of a correlation matrix of the reference tables and of the current image $I_k$, which involves a high degree of algorithmic complexity.

Thanks to such a member CBM 12, the first correction $\delta_{CBM}$ tends to converge, that is, to converge to zero, quickly, namely in a few tens of images, typically from 20 to 50 images. The member CBM 12 therefore has the particular advantage that the set of reference tables does indeed converge toward the offset table.

Through the quantization imposed by a programmable logic circuit such as an FPGA, the acronym for Field-Programmable Gate Array, the iterative operation can cause a divergent quantization noise.

Advantageously, in order to prevent these complications having to do with the iterative operation of the member CBM 12, adapted quantization strategies are implemented in the offset calculation stage 8. In particular, a quantization strategy based on a random quantization and resetting the first weighting factor $\alpha_k$ to zero for the weakest values is implemented in the offset calculation stage 8.

The current image $I_k$ being the resultant of the set of response signals supplied by the photodetectors of the array 6, it follows that the current image $I_k$ has two dimensions consisting of columns and lines.

The correction member based on the image morphology 14, or the member W1D 14, is configured to determine a column error. A column error means a noise correlated on the columns of the current image $I_k$. A column error results in a same noise value added to the values of the pixels in a given column of the current image.

More specifically, the member W1D 14 is configured to calculate, for each current image $I_k$, an average of the line gradients over the columns. In addition, the member W1D 14 is configured to obtain the column error by spatial integration of the average thus calculated. The member W1D 14 is therefore configured to determine a second correction $\delta_{W1D}$. More particularly, the member W1D 14 calculates a spatial integral of the average, over the columns of the current image $I_k$ in the video stream, of the line gradients.

Preferably, such an average is a robust average. A robust average means an average obtained only from gradient values falling within a predetermined tolerance interval. According to the invention, the gradients for each photodetector or pixel are compared to a confidence interval common to the entire image $I_k$.

Such features of the member W1D 14 are particularly advantageous. Indeed, using the robust average makes it possible to estimate the column error only in zones of confidence. This therefore reduces the risk of scene inlay, particularly when the current image $I_k$ comprises an elongated object.

In addition, estimating a column error is theoretically based on a median calculation. Resorting to a robust average leads to a satisfactory estimation of this median. This therefore makes it possible to do away with calculating the latter, which limits the computational resources involved.

Furthermore, although the calculation implemented by the member W1D 14 according to the invention limits the correction to a column error, that is, an error in a single dimension of the current image $I_k$, the determination of the column error, and therefore the second correction $\delta_{W1D}$, does away with resorting to a conventionally used temporal median. This has the advantage of allowing a correction for a single current image $I_k$.

Advantageously, for each current image $I_k$ associated with any given calculation instant k, the member W1D 14 is configured so that:

at least one intermediate image, advantageously a plurality of intermediate images, is generated; and the average, over the columns, of the gradients of the lines of the intermediate image, advantageously of each intermediate image, is calculated.

In particular, the intermediate image can be obtained by reducing the size of the current image $I_k$ by a corresponding reduction factor, for example 2', where i is any nonnegative integer.

The calculations with the various intermediate images are interpolated, particularly by setting to the original size, then summed. To ensure there is no over-correction, that is, a redundancy of information between the various intermediate images, the member W1D 14 allows for iterative operation. Thus, a single scale is calculated for each image. This has the advantage of increasing the convergence speed, which may be limited by the robust average calculation.

In addition, in this case the member W1D 14 is preferably configured to retain, as low-frequency value of the column error, the value obtained by integrating the robust averages of the gradients of the smallest intermediate image that does not consist of a single pixel. The low-frequency value of the column error makes it possible to estimate and correct a halo effect, often present in infrared cameras.

Thanks to such a member W1D 14, the second correction $\delta_{W1D}$ tends to converge, that is, to converge to zero, quickly, namely in a few tens of images, typically from 20 to 50 images.

The correction member based on the motion of the scene 16, or the member WHF 16, is configured to determine a residual high-frequency two-dimensional error, respectively residual high-frequency two-dimensional errors, for which the member CBM 12 and the member W1D 14, are not likely to provide an appropriate correction, particularly when the scene is in motion. Indeed, these members are inherently limited to errors present in the calibration table and one-dimensional errors.

Thanks to the member WHF 16, it is possible to refine the quality and precision of the offset table calculation, particularly when the scene is in motion.

In particular, the member WHF 16 is configured to perform robust temporal filtering of the high spatial frequencies of the current image $I_k$. The member WHF 16 first performs high-pass spatial filtering on the current image $I_k$ to isolate the high spatial frequencies of the image, which include both high noise frequencies and high scene frequencies. The member WHF 16 then performs temporal filtering on these high spatial frequencies to separate out the high noise frequencies, the noise being fixed in time, and the high scene frequencies, the temporal average of which is zero. The member WHF 16 thus eliminates the residual two-dimensional high-frequency errors. The member WHF 16 is therefore configured to determine a third correction $\delta_{WHF}$.

According to the invention, the robust temporal filtering of the high spatial frequencies on the current image $I_k$ is done by thresholding the high spatial frequencies to reduce the contribution of the high spatial frequencies to the offset table calculated by the offset calculation stage 8 in order to process the video stream delivered by the imaging device 4.

More specifically, the member WHF 16 is configured to determine, at any given calculation instant k, the third $\delta_{CBM}$ correction from the current image $I_k$, according to the law:

$$\delta_{WHF}(k) = \gamma * F_{sat}(F_{threshold}(F_2(I_k)))$$

where $\delta_{WHF}(k)$ is the value of the third correction at the calculation instant k;
$\gamma$ is a third predetermined weighting factor;
$F_{sat}$ is a predetermined saturation function;
$F_{threshold}$ is a predetermined thresholding function; and $F_2$ is a second predetermined high-pass spatial filter.

The temporal filtering is done by applying the third predetermined weighting factor $\gamma$. The third predetermined weighting factor $\gamma$ averages the filtered high spatial frequencies over time. The third weighting factory is between 0 and 1.

This has the effect of preventing an inlay of the edges of objects that contain high spatial frequencies independent of the offset error in the current image $I_k$ at the time of its processing. This is achieved by means of the thresholding function and the saturation function, which prevent such an inlay of the edges of objects. The third weighting factory plays a role as temporal average.

Preferably, the second high-pass spatial filter $F_2$ may comprise a high-pass filter acting on the lines of the current image $I_k$, also referred to as a line filter, and/or a high-pass filter acting on the columns of the current image $I_k$, also referred to as a column filter. Preferably, the line filter and the column filter are independent of each other. Furthermore, the line filter and the column filter are activated as a function of an output from the motion estimation member 18.

The uncoupled activation of the line filter and the column filter is intended to reduce potential scene inlay during horizontal or vertical linear motions in the video stream.

The motion estimation member 18 is configured to compare a spatial gradient and a temporal gradient of the images and to output information relating to a direction of motion in the current image $I_k$. The motion estimation member 18 provides information on the presence or absence of motion along the horizontal axis, or line, and along the vertical axis, or column.

The output from the motion estimation member 18 determines the start of operation of the member WHF 16. In addition, the output from the motion estimation member 18 determines whether the line filter and/or the column filter is activated when the third correction $\delta_{WHF}$ is calculated by the member WHF 16.

Thanks to such a member WHF 16, the third correction $\delta_{WHF}$ tends to converge, that is, tends toward zero, quickly, particularly in a few hundred images, with performance being all the better the greater the motion in the scene.

The result of the foregoing is that the determination of the offset table by the offset calculation stage 8 is done iteratively, with its value being refined over time. Consequently, calculation of the offset table requires little computational resources.

In addition, the use of weighting factors, such as the first weighting factor $\alpha_k$ or the third predetermined weighting factor $\gamma$, the sum of which is less than 1, when calculating the weighted sum of the first correction $\delta_{CBM}$, of the second correction $\delta_{W1D}$, and/or of the third correction $\delta_{WHF}$ on the outputs of the member CBM 12, of the member W1D 14 and of the member WHF 16, ensures the convergence of the whole.

The processing system 10 is configured to receive the video stream delivered by the imaging device 4 and to correct it by means of the current value of the offset table calculated by the offset calculation stage 8.

The video stream being output from the processing system 10 constitutes a corrected video stream. Thus, owing to the configuration of the offset calculation stage 8, such processing leads to an incremental improvement of the image quality in the video stream.

Preferably, the processing system 10 is configured to implement a one-point calibration and/or a photometric non-uniformity correction in order to pre-process the video stream so as to obtain a pre-processed video stream. In this case, the video stream, after implementation of the one-point calibration and/or of the photometric non-uniformity correction, forms the video stream applied to the input of the offset calculation stage 8 in order to establish the offset table.

Preferably, again, the processing stage 10 is configured to correct defective pixels in the video stream. In this case, the video stream obtained after implementation of the defective pixel correction constitutes the video stream applied to the input of the member WHF 16 and of the motion estimation member 18 for determining the third correction $\delta_{WHF}$.

In operation, the imaging device 4 delivers a video stream to the calibration device 2. A any given calculation instant k, the offset calculation stage 8 determines the current value of the offset table from the preceding value of the offset table and the correction calculated by the member CBM 12, the member W1D 14, and/or the member WHF 16 from the video stream, particularly from the current image $I_k$.

The processing system 10 then applies a correction to each pixel of the current image $I_k$ from the corresponding coefficient of the current offset table delivered by the offset calculation stage 8, in order to deliver the corrected video stream.

Obviously, the invention is not limited to the embodiments described above and provided merely as examples. The invention encompasses various modifications, alternative forms, and other variants that a person skilled in the art could conceive as part of the invention, and particularly any combinations of the various means of operation described above, taken either separately or in combination with each other.

The invention claimed is:

1. A method for calibrating a photodetector array providing a set of response signals forming a video stream comprising a series of current images, said method comprising:
    a determination step, wherein an offset table is determined for each current image of the video stream from at least two corrections from among the following:
    a first correction from a comparison of the current image to a corresponding reference table from among at least one predetermined reference offset table associated with the photodetector array;
    a second correction from a calculation of a column error of the current image; and
    a third correction from a temporal filtering of the high spatial frequencies of the current image of the video stream;
    a calculation step, wherein a current value of an offset table, equal to a sum between a previous value of the offset table and a weighted sum of the at least two corrections, is calculated, with each coefficient of the offset table being associated with a respective photodetector of the photodetector array.

2. The calibration method according to claim 1, wherein the first correction at any given calculation instant associated with the current image of the video stream, is determined according to the law:

$$\delta_{CBM}(k) = \alpha_k^* T_{R,k}$$

where $\delta_{CBM}(k)$ is the current value of the first correction at the calculation instant k;
$T_{R,k}$ is the reference offset table implemented at calculation instant k; and
$\alpha_k$ is a first weighting factor, between 0 and 1, at calculation instant k.

3. The calibration method according to claim 2, wherein the first weighting factor is determined according to the law:

$$\alpha_k = \frac{\langle F_1(T_{R,k}) \mid F_1(I_{k-1})\rangle}{\langle F_1(T_{R,k}) \mid F_1(T_{R,k})\rangle}$$

where $\langle \mid \rangle$ is the canonical scalar product;
$F_1$ is a first predetermined high-pass filter; and
$I_{k-1}$ is the image prior to the current image.

4. The calibration method according to claim 1, wherein the second correction, at any given calculation instant associated with the current image of the video stream, is determined from a calculation of a column error of the current image, so that:
    at least one intermediate image is generated; and
    the average, over the columns, of the gradients of the lines of the intermediate image is calculated.

5. The calibration method according to claim 1, wherein the second correction is equal to a spatial integral of an average of the line gradients over the columns of a current image of the video stream.

6. The calibration method according to claim 5, wherein the average is a robust average obtained from the gradient values falling within a predetermined confidence interval.

7. The calibration method according to claim 1, wherein the third correction at any given calculation instant from the current image of the video stream, is determined according to the law:

$$\delta_{WHF}(k) = \gamma^* F_{sat}(F_{threshold}(F_2(I_k)))$$

where $\delta_{WHF}(k)$ is the value of the third correction associated with instant k;
$\gamma$ is a third predetermined weighting factor;
$F_{sat}$ is a predetermined saturation function;
$F_{threshold}$ is a predetermined thresholding function; and
$F_2$ is a second predetermined high-pass spatial filter.

8. The calibration method according to claim 7, wherein the second high-pass spatial filter comprises a line filter configured to act on the lines of the current image and a column filter configured to act on the columns of the current image, and the method comprises implementation of the line filter and/or the column filter as a function of a result of an estimation of a motion in the video stream.

9. The calibration method according to claim 1, wherein the video stream is obtained by applying a one-point calibration and/or a photometric non-uniformity correction to the response signals.

10. The calibration method according to claim 1, wherein the calculation of the third correction is preceded by the application of a defective pixel correction to the video stream.

11. The method according to claim 1, further comprising implementation of the current value of the offset table to correct the video stream in order to deliver a corrected video stream.

12. A calibration device for calibrating a photodetector array providing a set of response signals forming a video stream comprising a series of images, comprising:
    an offset calculation stage capable of determining an offset table from at least two corrections for each current image of the video stream, the offset calculation stage comprising at least two of the following:

a correction member based on reference tables capable of determining for each current image of the video stream a first correction, from a comparison of the current image to a corresponding reference table from among at least one predetermined reference offset table associated with the photodetector array;

a correction member based on the image morphology capable of determining, for each current image of the video stream, a second correction from a calculation of a column error of the current image; and a correction member based on the motion of the scene capable of determining, for each current image of the video stream, a third correction from a temporal filtering of the high spatial frequencies of the current image of the video stream.

13. The calibration device for calibrating a photodetector array according to claim 12, wherein the first correction at any given calculation instant associated with the current image of the video stream, is determined according to the law:

$$\delta_{CBM}(k) = \alpha_k^* T_{R,k}$$

where $\delta_{CBM}(k)$ is the current value of the first correction at the calculation instant k;

$T_{R,k}$ is the reference offset table implemented at calculation instant k; and $\alpha_k$, is a first weighting factor, between 0 and 1, at calculation instant k.

14. The calibration device for calibrating a photodetector array according to claim 13, wherein the first weighting factor is determined according to the law:

$$\alpha_k = \frac{\langle F_1(T_{R,k}) \mid F_1(I_{k-1}) \rangle}{\langle F_1(T_{R,k}) \mid F_1(T_{R,k}) \rangle}$$

where <|> is the canonical scalar product;

$F_1$ is a first predetermined high-pass filter; and $I_{k-1}$ is the image prior to the current image ($I_k$).

15. The calibration device for calibrating a photodetector array according to claim 12, wherein the correction member based on the image morphology is configured, for each current image associated with any given calculation instant, so that:

at least one intermediate image is generated; and the average, over the columns, of the gradients of the lines of the intermediate image is calculated.

16. The calibration device for calibrating a photodetector array according to the claim 12, wherein the third correction at any given calculation instant from the current image of the video stream, is determined according to the law:

$$\delta_{WHF}(k) = \gamma^* F_{sat}(F_{threshold}(F_2(I_k)))$$

where $\delta_{WHF}(k)$ is the value of the third correction associated with instant k;

$\gamma$ is a third predetermined weighting factor;

$F_{sat}$ is a predetermined saturation function;

$F_{threshold}$ is a predetermined thresholding function; and $F_2$ is a second predetermined high-pass spatial filter.

17. The calibration device for calibrating a photodetector array according to claim 16, wherein the second high-pass spatial filter comprises a line filter configured to act on the lines of the current image, and a column filter configured to act on the columns of the current image.

18. The calibration device for calibrating a photodetector array according to claim 17, further comprising a processing system configured to receive an offset table calculated by the offset calculation stage in order to process and/or correct the video stream.

19. The calibration device for calibrating a photodetector array according to claim 12, further comprising a motion estimation member configured to compare a spatial gradient and a temporal gradient of the images and to output information relating to a direction of motion in the current image.

20. The imaging system comprising:

an imaging device; and a calibration device according to claim 12, the calibration device being connected to the output of the imaging device and the imaging device comprising a photodetector array configured to deliver response signals from the photodetector array to the calibration device.

* * * * *